(12) United States Patent
Mitchell et al.

(10) Patent No.: US 10,978,093 B1
(45) Date of Patent: Apr. 13, 2021

(54) COMPUTER APPARATUS AND METHOD IMPLEMENTING SOUND DETECTION TO RECOGNIZE AN ACTIVITY

(71) Applicant: Audio Analytic Ltd, Cambridgeshire (GB)

(72) Inventors: Christopher James Mitchell, Cambridgeshire (GB); Sacha Krstulovic, Cambridgeshire (GB); Neil Cooper, Cambridgeshire (GB); Julian Harris, Cambridgeshire (GB); Simon Worgan, Cambridgeshire (GB)

(73) Assignee: AUDIO ANALYTIC LTD

( * ) Notice: Subject to any disclaimer, the term of this patent is extended or adjusted under 35 U.S.C. 154(b) by 0 days.

(21) Appl. No.: 16/718,761

(22) Filed: Dec. 18, 2019

(51) Int. Cl.
*G10L 25/51* (2013.01)
*G01P 13/00* (2006.01)
*H04R 29/00* (2006.01)

(52) U.S. Cl.
CPC .............. *G10L 25/51* (2013.01); *G01P 13/00* (2013.01); *H04R 29/004* (2013.01)

(58) Field of Classification Search
CPC ......... G06F 3/165; H04L 67/22; H04L 67/24; H04M 1/6033; H04M 1/605; H04M 1/72572; H04M 3/568
USPC ...................................................... 381/56–59
See application file for complete search history.

(56) References Cited

U.S. PATENT DOCUMENTS

2018/0268735 A1* 9/2018 Jihn ....................... A61B 5/486
2019/0227096 A1* 7/2019 Chowdhary ...... H04M 1/72569

* cited by examiner

*Primary Examiner* — George C Monikang
(74) *Attorney, Agent, or Firm* — Tarolli, Sundheim, Covell & Tummino LLP

(57) ABSTRACT

A computing device, the computing device comprising a processor configured to: receive audio information relating to one or more non-verbal sounds captured by a microphone in an environment of a user; receive motion information that is based on motion sensor data captured by a motion sensor, said motion information relating to motion of said user in the environment; process the audio information and the motion information to recognise an activity of said user; and output an activity recognition notification indicating said activity.

20 Claims, 6 Drawing Sheets

COMPUTER APPARATUS AND METHOD IMPLEMENTING SOUND DETECTION TO RECOGNIZE AN ACTIVITY

FIELD

The present disclosure generally relates to monitoring sound events in a computer monitored environment, and triggering computer implemented actions in response to such sound events.

BACKGROUND

Background information on sound recognition systems and methods can be found in the applicant's PCT application WO2010/070314, which is hereby incorporated by reference in its entirety.

In addition, it is known to detect a user's motion detection based on a motion sensor accelerometer or a location sensor. The present applicant has recognised the potential for new applications of sound recognition systems.

SUMMARY

The inventors have identified that activity detection based on accelerometer or location signals is prone to errors. For example, motion patterns for when a user is travelling at low speeds can be the same for when the user is travelling by car, bicycle or walking. In a sports context, a user jogging and playing football results in similar running motion patterns. In a more general activity recognition context, lifting a cup and lifting a fork can produce similar accelerometer patterns.

According to a first aspect there is provided a computing device, the computing device comprising a processor configured to: receive audio information relating to one or more non-verbal sounds captured by a microphone in an environment of a user; receive motion information that is based on motion sensor data captured by a motion sensor, said motion information relating to motion of said user in the environment; process the audio information and the motion information to recognise an activity of said user; and output an activity recognition notification indicating said activity.

In embodiments described herein, the accuracy of activity detection is improved by the extra information supplied by audio in addition to the recognition of motion. That is, adding the audio sensing/sound detection modality adds information which is complementary and helps disambiguate between different activity detections.

The audio information may comprise an indication of a recognition of one or more of a non-verbal sound event and a scene.

The audio information may comprise a time identifier associated with said one or more of a non-verbal sound event and a scene The time identifier may comprises at least one of: a start time of said one or more of a non-verbal sound event and a scene; an end time of said one or more of a non-verbal sound event and a scene; and a duration of said one or more of a non-verbal sound event and a scene.

The motion information may comprise an activity identifier indicative of an activity of said user and an activity time identifier associated with said activity.

The audio information may comprise an indication of a recognition of one or more of a non-verbal sound event and a scene and a time identifier associated with said one or more of a non-verbal sound event and a scene; and the motion information may comprise an activity identifier indicative of an activity of said user and an activity time identifier associated with said activity. The processor may be configured to combine the audio information and the motion information to generate acoustic-motion data and recognise said activity of said user by processing the acoustic-motion data.

The processor may be configured to determine whether modification of the activity identifier is necessary based on the audio information, wherein if modification of the activity identifier is necessary, the processor may be configured to generate a modified activity identifier based on the activity identifier and the audio information, wherein the activity recognition notification may comprise the modified activity identifier; and if modification of the activity identifier is not necessary, the processor may be configured to generate the activity recognition notification which may comprise a notification activity identifier which corresponds to the activity identifier in the motion information The processor may be configured to determine whether modification of the activity time identifier is necessary based on the audio information, wherein if modification of the activity time identifier is necessary, the processor may be configured to generate a modified activity time identifier based on the activity time identifier and the audio information, wherein the activity recognition notification may comprise the modified activity time identifier; and if modification of the activity time identifier is not necessary, the processor may be configured to generate the activity recognition notification which may comprise a notification time identifier which corresponds to the activity time identifier in the motion information The audio information may comprise, for each frame of a sequence of frames of audio data captured by the microphone, a score for each of a set of sound classes that the frame represents the sound class. The motion information may comprise, for each frame of a sequence of frames of motion data captured by the motion sensor, a score for each of a set of activity classes that the frame represents the activity class.

The processor may be configured to process the audio information and the motion information to recognise an activity of said user by: inputting each frame of: said scores for each of a set of sound classes that the frame represents the sound class; and said scores for each of a set of activity classes that the frame represents the activity class; into a machine learning model trained to recognise an activity.

The audio information may comprise multiple acoustic features for each frame of a sequence of frames of audio data captured by the microphone. The motion information comprises multiple motion features for each frame of a sequence of frames of motion data captured by the motion sensor.

Both the sequence of frames of audio data and the sequence of frames of motion data may be time series, thus there features of each may be similar in some ways. Examples of features in the frames of audio data and/or motion data include: spectral analysis with the Fast Fourier Transform; zero crossing rate; Mel or Log or Linear filterbank features. As, for example, the frame rate of the sequence of frames of motion data may be lower than the frame rate of the sequence of frames of audio data, a longer time window may be advantageously to calculate a Fast Fourier Transform for the frames of motion data compared to the frames of audio data.

The processor may be configured to process the audio information and the motion information to recognise an activity of said user by: for each frame, concatenating the multiple acoustic features and the multiple motion features to generate a frame of concatenated acoustic-motion features; and inputting each frame of concatenated acoustic-motion features into a machine learning model trained to recognise an activity.

The processor may be configured to process the audio information and the motion information to recognise an activity of said user by inputting the audio information and the motion information into a machine learning model configured to output an indication of an activity; and generate said activity recognition notification indicating said activity based on said indication of an activity outputted by the machine learning model.

The activity recognition notification may comprise an indication of a time associated with the recognised activity.

The processor may be configured to receive one or more of the audio information and the motion information from at least one remote computing device The computing device may comprise one or more of: the microphone; and the motion sensor.

The processor may be configured to output the activity recognition notification to an output device on said computing device. An output device may be, for example, a display, a light, a speaker.

The processor may be configured to output the activity recognition notification to an activity processing module on said computing device.

The processor may be configured to output the activity recognition notification, via a network interface on said computing device, to a remote notification device The motion information may be based on information captured by one or more of: an accelerometer; a gyroscope; a magnetometer; a location sensor; a barometer; and a pressure sensor; radio wave sensor.

The computing device may be one of: a smart phone; a smart speaker; an in-vehicle device; a wearable device; a hearable device; and an industrial monitoring device; a virtual reality headset, an augmented reality headset; a game controller.

According to another aspect there is provided computer implemented method of recognising an activity of a user, the method comprising: receiving audio information relating to one or more non-verbal sounds captured by a microphone in an environment of the user; receiving motion information that is based on motion sensor data captured by a motion sensor, said motion information relating to motion of said user in the environment; processing the audio information and the motion information to recognise an activity of said user; and outputting an activity recognition notification indicating said activity.

In a related aspect there is provided a non-transitory data carrier carrying processor control code which when running on a processor of a device causes the device to operate as described.

It will be appreciated that the functionality of the devices we describe may be divided across several modules and/or partially or wholly implemented in the cloud. Alternatively, the functionality may be provided in a single module or a processor. The or each processor may be implemented in any known suitable hardware such as a microprocessor, a Digital Signal Processing (DSP) chip, an Application Specific Integrated Circuit (ASIC), Field Programmable Gate Arrays (FPGAs), a Graphical Processing Unit (GPU), a Tensor Processing Unit (TPU), and so forth. The or each processor may include one or more processing cores with each core configured to perform independently. The or each processor may have connectivity to a bus to execute instructions and process information stored in, for example, a memory.

The invention further provides processor control code to implement the above-described systems and methods, for example on a general purpose computer system, a digital signal processor (DSP) or a specially designed math acceleration unit such as a Graphical Processing Unit (GPU) or a Tensor Processing Unit (TPU). The invention also provides a carrier carrying processor control code to, when running, implement any of the above methods, in particular on a non-transitory data carrier—such as a disk, microprocessor, CD- or DVD-ROM, programmed memory such as read-only memory (Firmware), or on a data carrier such as an optical or electrical signal carrier. The code may be provided on a carrier such as a disk, a microprocessor, CD- or DVD-ROM, programmed memory such as non-volatile memory (e.g. Flash) or read-only memory (Firmware). Code (and/or data) to implement embodiments of the invention may comprise source, object or executable code in a conventional programming language (interpreted or compiled) such as C, or assembly code, code for setting up or controlling an ASIC (Application Specific Integrated Circuit), FPGA (Field Programmable Gate Array), GPU (Graphical Processing Unit), TPU (Tensor Processing Unit) or NPU (Neural Processing Unit), or code for a hardware description language such as Verilog™ or VHDL (Very high speed integrated circuit Hardware Description Language). As the skilled person will appreciate such code and/or data may be distributed between a plurality of coupled components in communication with one another. The invention may comprise a controller which includes a microprocessor, working memory and program memory coupled to one or more of the components of the system. The invention may comprise performing a DNN operation on a GPU and/or an AI accelerator microprocessor, and performing other operations on a further processor.

These and other aspects will be apparent from the embodiments described in the following. The scope of the present disclosure is not intended to be limited by this summary nor to implementations that necessarily solve any or all of the disadvantages noted.

BRIEF DESCRIPTION OF THE DRAWINGS

For a better understanding of the present disclosure and to show how embodiments may be put into effect, reference is made to the accompanying drawings in which.

DETAILED DESCRIPTION

Embodiments described herein relate to providing improved detection of activity by combining detection of a user's activity based on motion sensor signals with the recognition of non-verbal sounds (i.e. a non-speech sound event). The non-verbal sound may be any non-speech sound that may be generated in an environment of a user for example a breaking glass sound, smoke alarm sound, baby cry sound etc. The non-verbal sound may be a sound produced by a human (e.g. paralinguistic speech such as laughter or coughing) or an animal. The non-verbal sound may be a vocal sound such as onomatopoeia (for example the imitation of animal sounds). This is in contrast to known voice assistant devices that typically respond to the detection of a human speaking a command word.

Figure 1:
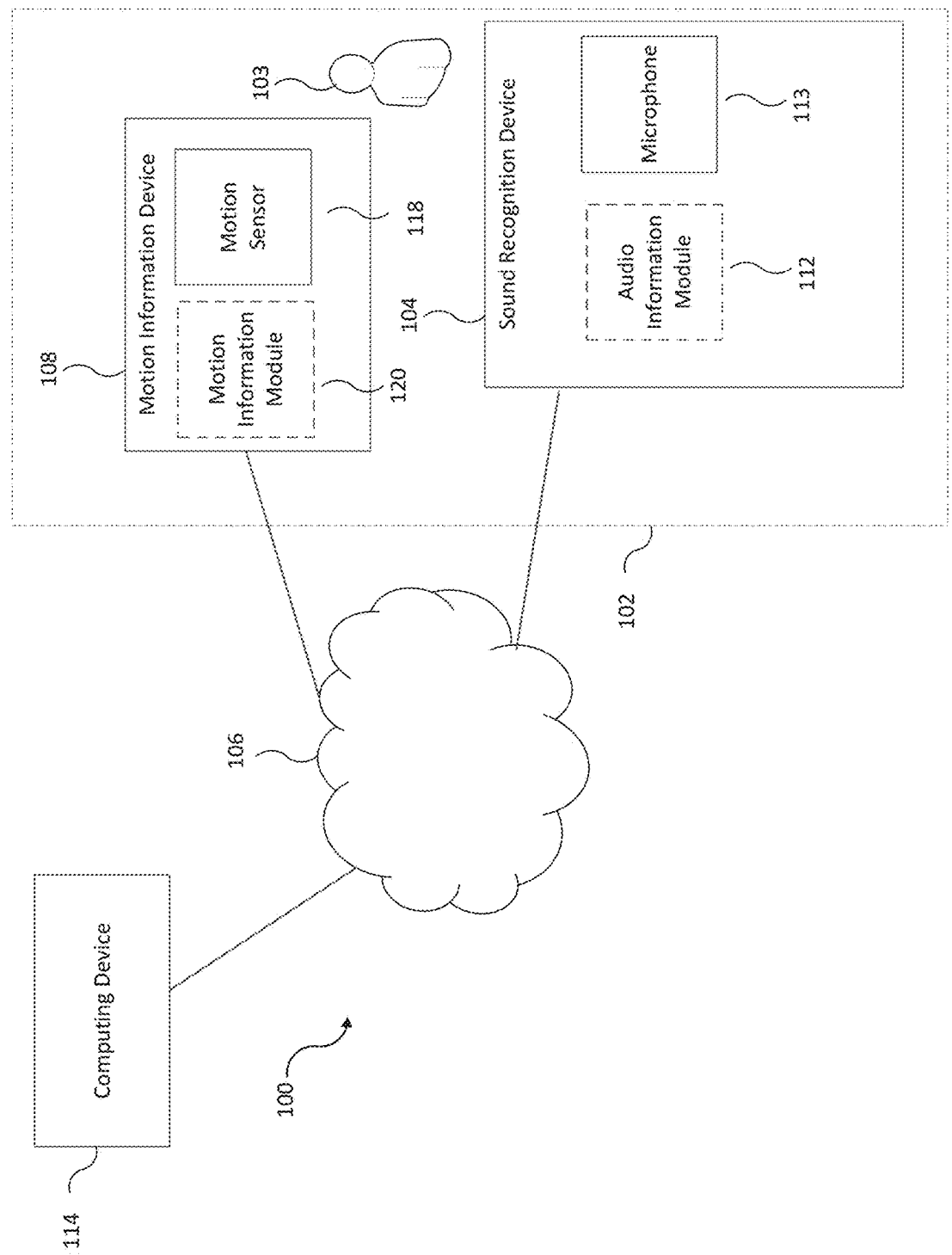
FIG. 1 shows a block diagram of a system to recognise an activity of a user.

FIG. 1 shows a block diagram of a system 100 comprising example devices. The system 100 comprises devices connected via a network 106. The system 100 comprises a sound recognition device 104, a motion information device 108, and an activity detection computing device 114. These devices may be connected to one another wirelessly or by a wired connection, for example by the network 106, or may be merged in a single device as described below. The motion information device 108 comprises a motion sensor 118 configured to capture motion sensor data. The motion information device 108 optionally additionally comprises a motion information module 120 configured to process the motion sensor data to generate motion information. However, the motion information module 120 may be positioned elsewhere in the system. The sound recognition device 104 comprises a microphone 113 and optionally additionally comprises an audio information module 112. The audio information module may be positioned elsewhere in the system 100. The microphone 113 and motion sensor 118 are positioned in an environment 102. The environment 102 may further comprise a user 103.

In embodiments, the microphone 113 and the audio information module 112 may be situated on different devices. For example, the audio information module 112 may be situated on the activity detection computing device 114. However, even in these embodiments, the microphone 113 is situated in the environment 102. This is because the microphone 113 is configured to capture a sound in the environment 102.

The motion sensor 118 may be one of many motion sensors. For example the motion sensor may be any one of an accelerometer, a gyroscope, a magnetometer (compass), a GPS sensor, a barometer (altitude sensor), ambient light sensor, proximity sensor, camera (including infra-red, truedepth, optical-flow method), step counter or any other type of sensor bases on motion or location sensing technology. The motion sensor may comprise, or be coupled with, an analogic-to-digital converter configured to turn analogue motion or location signals into digital signals. The motion sensor 118 may be configured to sense acceleration in a x/y/z space (including or excluding gravity), gravity, gyroscope, rotation, significant motion (i.e. a change in user's location due to walking, biking, sitting in moving car), a number of steps, motion measurements may include acceleration x/y/z (including or excluding gravity), gravity, gyroscope, rotation, significant motion ("change in user's location" e.g. walking, biking, sitting in moving car), step detector, step counter, GPS coordinates, NFC signal strength, Wi-Fi/BT signal strength, mobile tower location, internet access point locationPS coordinates, NFC signal strength, WiFi®/Bluetooth® signal strength, mobile phone tower location, internet access point location, or other motion or location measurement technologies.

Whilst FIG. 1 shows the sound recognition device 104, the motion information device 108 and the activity detection computing device 114 as being separate devices, this is only an example and the functionality of one or more of the sound recognition device 104, the motion information device 108 and the activity detection computing device 114 may be part of a single device. That is, in one example the functionality of all of the sound recognition device 104, the motion information device 108 and the activity detection computing device 114 are provided on a single computing device. In particular, in each of the embodiments described below, each of the processing stages may be implemented by way of portions of code executable on one or more processor of a single computing device. In other words, there may be a smartphone, a wearable device, a hearable device, an vehicle, an industrial monitoring device, comprising at least the motion sensor 118 and the microphone 113, and further optionally comprising one or more of the audio information module 112 and the motion information module 120, and further optionally may perform the functionality of the activity detection computing device 114.

As explained in further detail below, the activity detection computing device 114 is configured to receive information from the sound recognition device 104 and the motion information device 108 and detect an activity in the environment 102 by processing the received information.

Figure 2:
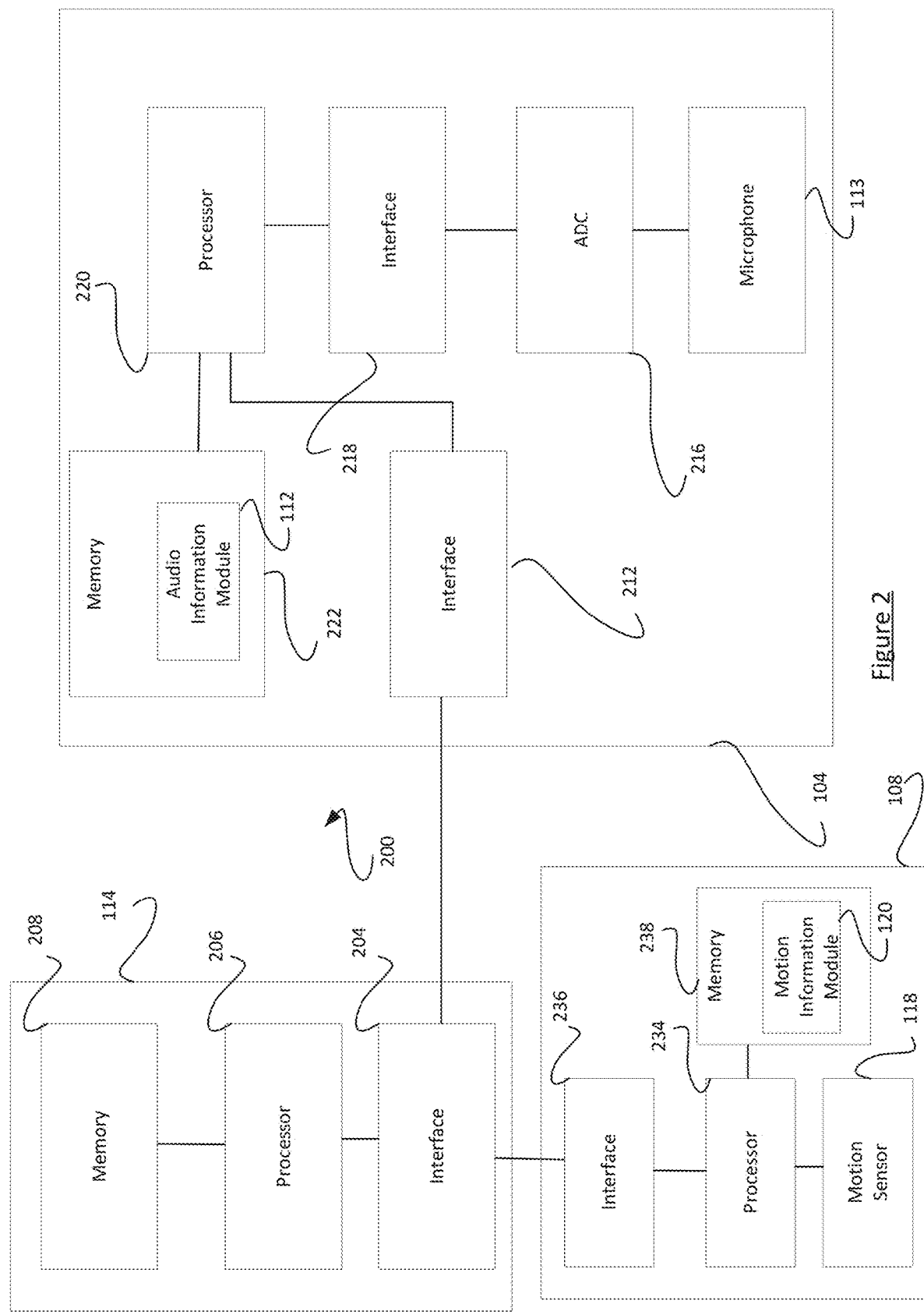
FIG. 2 shows a block diagram of a computing device.

FIG. 2 shows a block diagram of a system 200 comprising the activity detection computing device 114 in connection with the sound recognition device 104 and the motion information device 108.

FIG. 2 shows the activity detection computing device 114 comprising a memory 208, a processor 206 and an interface 204. The interface is configured to communicate wirelessly or via a wired connection with an interface 212 of the sound recognition device 104.

Figure 3:
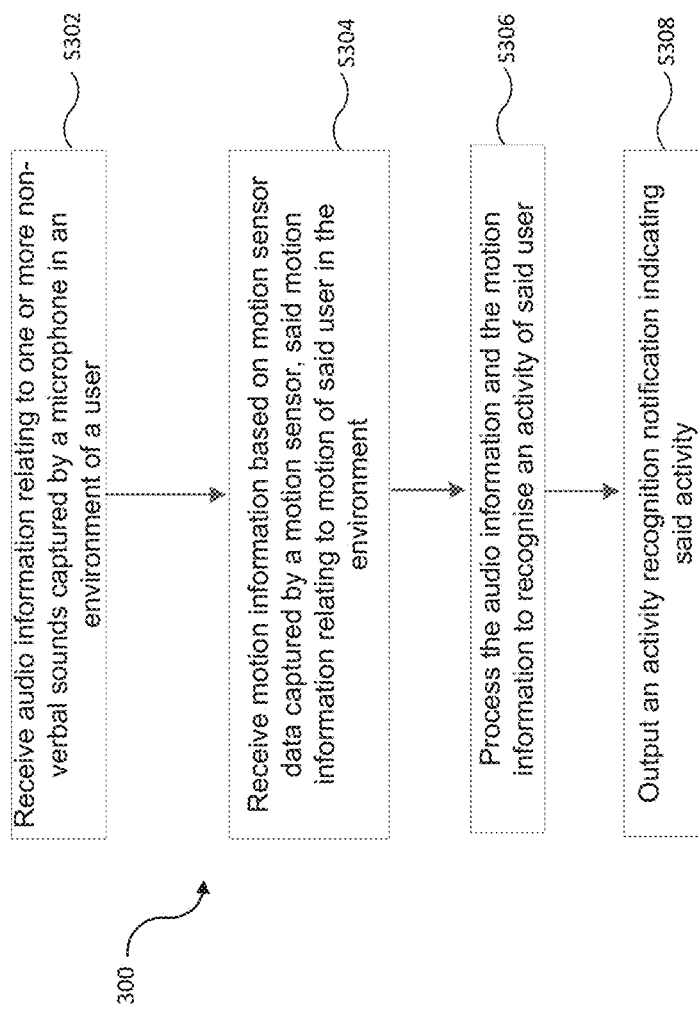
FIG. 3 is a flow chart illustrating a process to recognise an activity of a user.

The processor 206 of the activity detection computing device 114 is configured to perform the method illustrated in FIG. 3. As part of this method, the processor 205 of the activity detection computing device 114 is configured to receive audio information from the audio information module 112, said audio information relating to one or more non-verbal sounds captured by the microphone 113.

FIG. 2 further shows the sound recognition device 104. The sound recognition device 104 may be any type of electronic device. The sound recognition device 104 may be a consumer electronic device. For example, a consumer electronic device may be, a smartphone, a headphone, an earphone, a smart speaker, a car, a digital personal assistant, a personal computer, a tablet computer, a device attached to a piece of sports equipment etc. The sound recognition device 104 comprises a memory 222, a processor 220, a microphone 113, an analogue to digital converter (ADC) 216, an interface 212 and an interface 218. The processor 220 is in connection to: the memory 222; the microphone 113; the analogue to digital converter (ADC) 216; interface 218; and the interface 212. The processor 220 is configured to process sound captured by the microphone 113. As will be explained with reference to FIG. 4-6, the sound recognition may process the captured sound in a number of different ways before sending the processed captured sound (i.e. the audio information) to the activity detection computing device 114 via the interface 212. The processor 220 may comprise one or more of a CPU module and a DSP module. The memory 222 is configured to store computer code that when executed by the processor 220, causes the processor to process the captured sound to generate the audio information. In embodiments, memory 222 is configured to store computer code that when executed by the processor 220, causes the processor to process the captured sound to recognise a non-verbal sound event and/or scene, this is displayed by the audio information module 112 stored in the memory 222.

The microphone 13 is configured to convert a sound into an audio signal. The audio signal may be an analogue signal, in which case the microphone 113 is coupled to the ADC 216 via the interface 218. The ADC 216 is configured to convert the analogue audio signal into a digital signal. The digital audio signal can then be processed by the processor 220. In embodiments, a microphone array (not shown) may be used in place of the microphone 113.

Although the ADC 216 and the microphone 113 are shown as part of the sound recognition device 104, one or more of the ADC 216 and the microphone 113 may be located remotely to the sound recognition device 104. If one or more of the ADC 216 and the microphone 113 are located remotely to the sound recognition device 104, the processor 220 is configured to communicate with the ADC 216 and/or the microphone 113 via the interface 218 and optionally further via the interface 212.

The processor 103 may further be configured to communicate with a remote computing system (not shown). The remote computing system is configured to generate the audio information, therefore the processing steps required to generate the audio information may be spread between the processor 220 and a processor of the remote computing system The interface 204 of the activity detection computing device 114 is further configured to communicate with the motion information device 108 via the interface 236 of the motion information device. The processor 206 of the activity detection computing device 114 is configured to receive, via the interface 204, motion information (S302).

The audio information module 112, motion information module 120, microphone 113, motion sensor 118 and the activity detection computing device 114 may form a single device, such as a consumer electronic device.

In an alternative embodiment, audio information module 112, motion information module 120, microphone 113, motion sensor 118 and the activity detection computing device 114 may all be on separate devices.

In a further embodiment, the audio information module 112, motion information module 120 and the activity detection computing device 114 form a single device, for example a cloud computing device, and the microphone 113 and the motion sensor 118 are positioned on one or more separate devices, for example remote sensing devices.

FIG. 3 is a flow chart illustrating a process 300 to recognise an activity according to an embodiment. In embodiments, the process 300 is carried out by the processor 206 of the activity detection computing device 114.

At step S302, audio information relating to one or more non-verbal sounds captured by a microphone in an environment of a user is received. The form that the audio information takes varies depending on the embodiment, as described in more detail below. The detail of the processing steps for a number of embodiments will be described in more detail with reference to FIGS. 4 to 6.

At step S304, motion information based on motion sensor data captured by a motion sensor is received. The motion information relating to motion of user 103 in the environment.

At step S306, the audio information and the motion information are processed to recognise an activity of the user. The exact processing steps may depend on the nature of the motion information and audio information received by the processor 206 of the activity detection computing device 114. The detail of the processing steps for a number of embodiments will be described in more detail with reference to FIGS. 4 to 6.

At step S308, an activity recognition notification indicating said activity is output. The activity recognition notification may be output to an API and/or an alerting system which conveys the activity recognition outside of the system 100. For example, the activity recognition notification may be output to further devices or systems that are configured to react to activity recognition.

Embodiment 1: Sound Recognition

Figure 4:
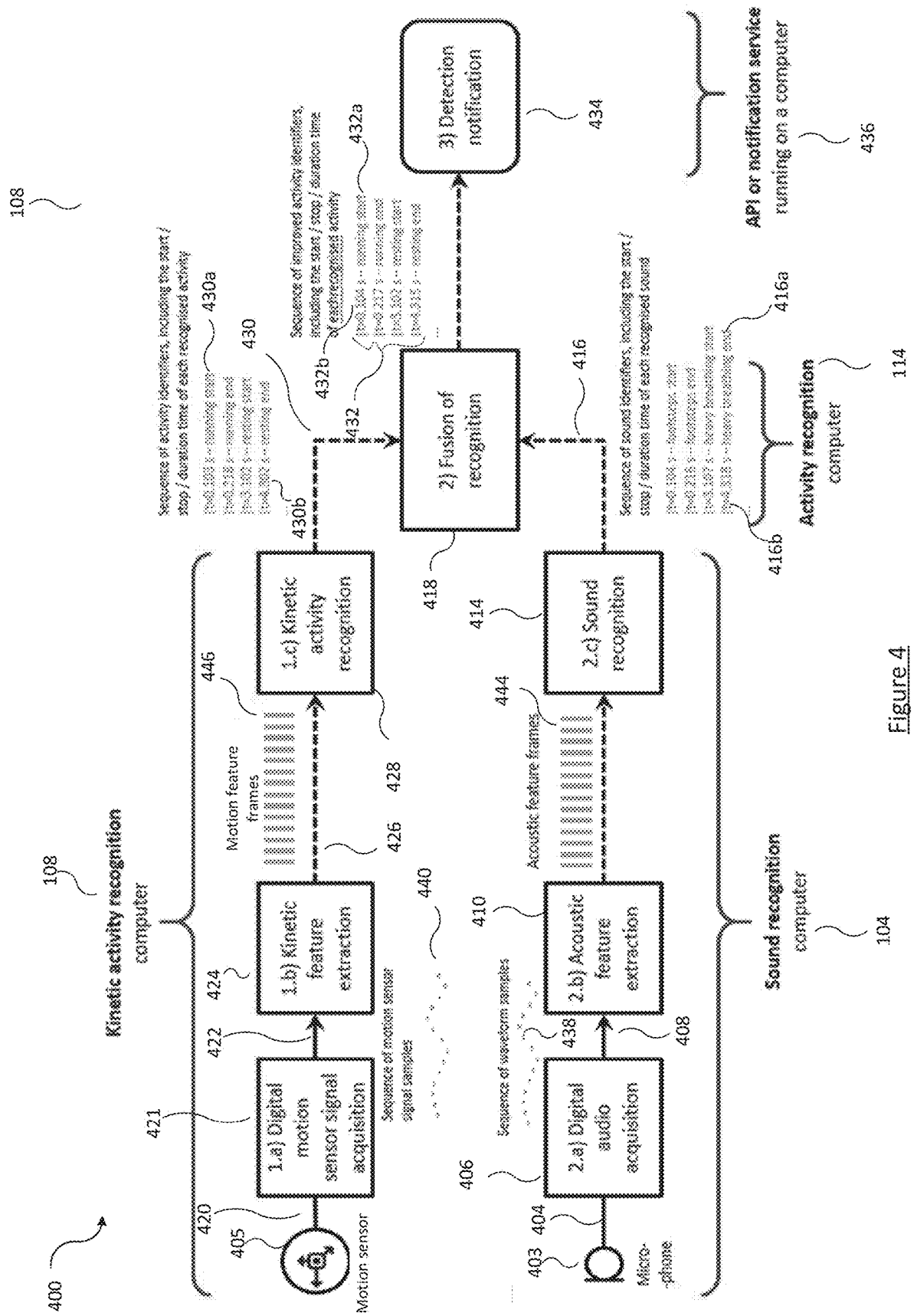
FIG. 4 is a schematic diagram illustrating an implementation of a first embodiment of the present disclosure.

FIG. 4 shows a schematic diagram illustrating an implementation of a first embodiment.

One or more non-verbal sounds are acquired by a microphone 403, for example microphone 113 of FIG. 1. The audio samples are supplied via connection 404 to an analogue to digital converter 406 and converted from analogue samples to digital samples. The microphone 403 may correspond to the microphone 113 shown in FIG. 2. The analogue to digital converter 406 may correspond to the ADC 216 shown in FIG. 2. With reference to FIG. 2, the processor 220 is configured to receive the digital sample from the ADC 216 via the interface 218, for example a serial interface such as 120. The sampling frequency may be 16 kHz, this means that 16,000 audio samples are taken per second.

The analogue to digital converter 406 outputs a sequence of digital audio samples 438. The digital audio samples may be grouped into a series of 32 ms long frames with 16 ms long hop size. If the sampling frequency is 16 Khz, then this is equivalent to the digital audio sample being grouped into a series of frames that comprise 512 audio samples with a 256 audio samples-long hop size.

Once the digital audio samples have been acquired, feature extraction is performed on frames of the digital audio samples 438 by acoustic feature extraction stage 410. The acoustic feature extraction stage 410 outputs a sequence of acoustic feature frames 444. The acoustic feature extraction stage 410 comprises transforming the sequence of digital waveform samples 438 into a series of multidimensional feature vectors 444 (i.e. frames), for example emitted every 16 ms. The acoustic feature extraction of stage 410 may be implemented in a variety of ways.

One implementation of acoustic feature extraction stage 410 is to perform one or more signal processing algorithms on the sequence of waveform samples 438. An example of a signal processing algorithm is an algorithm that processes a power spectrum of the frame, for example obtained using the fast Fourier transform (FFT), to extract a spectral flatness value for the frame. A further example is a signal processing algorithm that extracts harmonics and their relative amplitudes from the frame.

An additional or alternative implementation of the acoustic feature extraction stage 410 is to use a Deep Neural Network (DNN) to extract a number of acoustic features for a frame. A DNN can be configured to extract audio feature vectors of any dimension. A bottleneck DNN embedding or any other appropriate DNN embedding may be used to extract acoustic features. Here a neural network bottleneck may refer to a neural network which has a bottleneck layer between an input layer and an output layer of the neural network, where a number of units in a bottleneck layer is less than that of the input layer and less than that of the output layer, so that the bottleneck layer is forced to construct a generalised representation of the acoustic input.

The acoustic feature frames 444 are then processed to recognise a sound and/or scene at sound recognition stage 414, this processing can be performed in a number of ways, an example sound recognition method that may be used at step will be described below.

Figure 5:
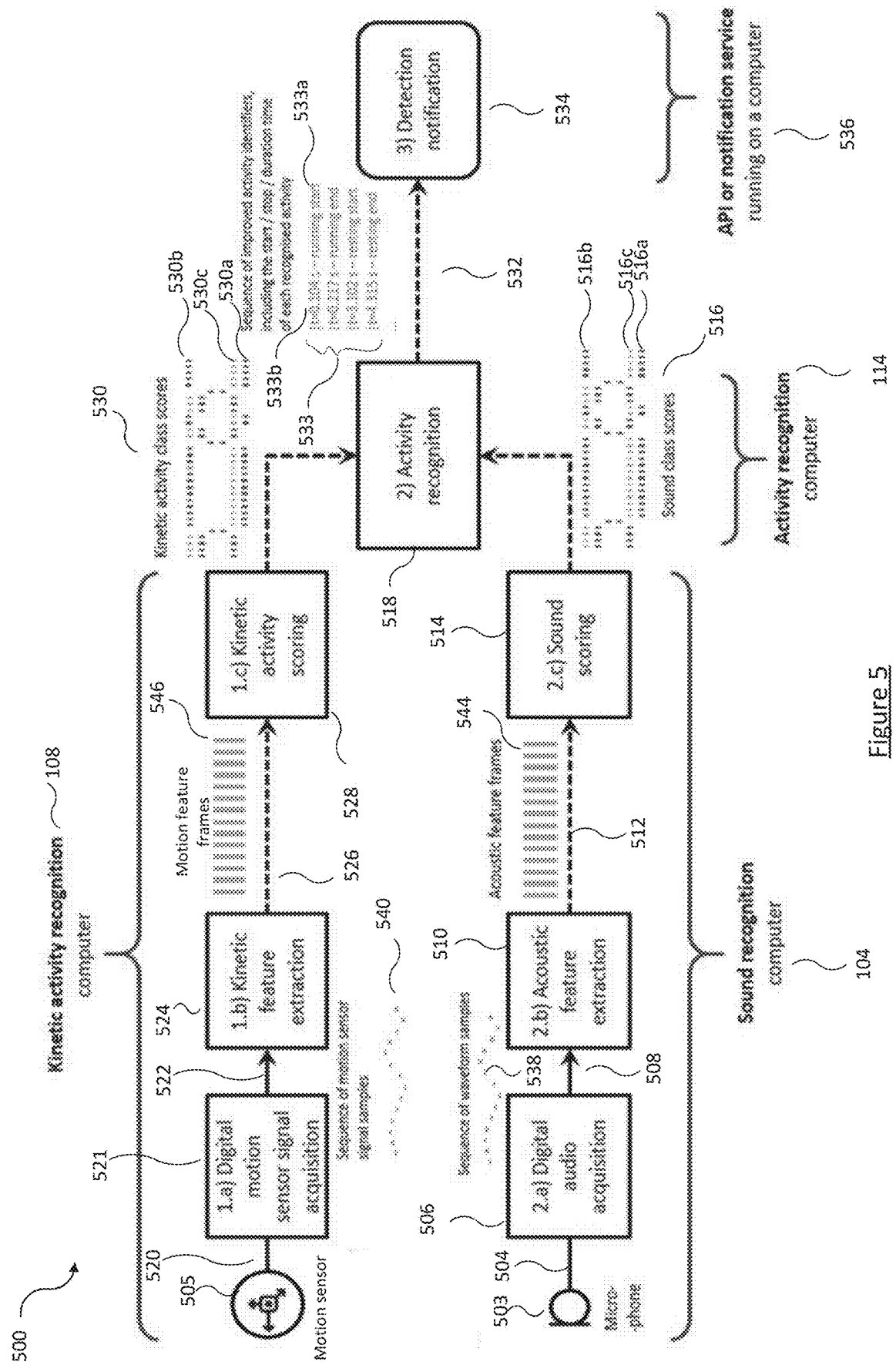
FIG. 5 is a schematic diagram illustrating an implementation of a second embodiment of the present disclosure.

A first step of recognising a sound and/or scene performed at sound recognition stage 414 comprises an acoustic modelling step classifying the acoustic features to classify the frame by determining, for each of a set of sound classes, a score that the frame represents the sound class (an example sound scoring stage 514 which outputs resultant sound scores 516 is shown in FIG. 5). In one example, the acoustic modelling step comprises using a deep neural network (DNN) trained to classify each incoming acoustic feature vector into a sound class (e.g. glass break, dog bark, baby cry etc.). Therefore, the input of the DNN is an acoustic feature vector and the output is a score for each sound class. The scores for each sound class for a frame may collectively be referred to as a frame score vector. For example, the DNN used in the sound recognition stage 414 (and sound scoring stage 514) is configured to output a score for each sound class modelled by the system every 16 ms.

An example DNN used in sound recognition stage 414 (and sound scoring stage 514) is a feed-forward fully connected DNN having 992 inputs (a concatenated feature vector comprising 15 acoustic vectors before and 15 acoustic vectors after a central acoustic vector=31 frames×32 dimensions in total). The example DNN has 3 hidden layers with 128 units per layer and RELU activations.

Alternatively, a convolutional neural network (CNN), a recurrent neural network (RNN) and/or some other form of deep neural network architecture or combination thereof could be used.

With a brief reference to FIG. 5, a schematic example of an output of the DNN is shown by way of sound class score 516. In this example, there are three different sound classes represented by three colours: grey (516c), red (516b) and blue (516a). The horizontal axis represents time and the vertical axis represents a value of a score (where a downward vertical direction represents a high score). Each dot is a score value corresponding to a frame of audio data.

A score warping step is an optional step that follows where the scores are reweighted according to probabilities learned from application-related data. In other words, the scores output by the DNN are adjusted based on some form of knowledge other than the audio data acquired. The knowledge may be referred to as external information, examples of such external information. As examples, the score warping may comprise the following method: using prior probabilities of sound event and/or scene occurrence for a given application to reweight one or more scores. For example, for sound recognition in busy homes, the scores for any sound class related to speech events and/or scenes would be weighted up. In contrast, for sound recognition in unoccupied homes, the scores for any sound class related to speech events and/or scenes would be weighted down.

Returning back to FIG. 4 and the example processing performed by sound recognition stage 414, following the described acoustic modelling step classifying the acoustic features, long-term acoustic analysis is performed. The long-term acoustic analysis comprises processing the sound class scores for multiple frames of the sequence of frames to generate, for each frame, a sound class decision for each frame. The long-term acoustic analysis outputs frame-level classification decisions after integrating longer term temporal information, typically spanning one or several seconds, into the frame-level scoring.

As an example, if there are four sound classes: A, B, C and D, the long-term acoustic analysis performed will comprise receiving a sequence of vectors. Each vector would have four dimensions, where each dimension represents a (optionally reweighted) score for a class. The long-term acoustic analysis performed at comprises processing the multiple vectors that represent a long-term window, typically 1.6 second/100 score values long context window. The long-term acoustic analysis will then comprise outputting a series of classification decisions for each frame (i.e. the output will be A, B, C or D for each frame, rather than 4 scores for each frame). The long-term acoustic analysis therefore uses information derived from frames across a long-term window.

The long-term acoustic analysis can be used in conjunction with external duration or co-occurrence models. For example:

Transition matrices can be used to impart long-term information and can be trained independently of Viterbi. Transition matrices are an example of a co-occurrence model and also implicitly a duration model. Co-occurrence models comprise information representing a relation or an order of events and/or scenes.

An explicit model of duration probabilities can be trained from ground truth labels (i.e. known data), for example fitting a Gaussian probability density function on the durations of one or several baby cries as labelled by human listeners. In this example, a baby cry may last between 0.1 s and 2.5 s and be 1.3 s long on average. More generally, the statistics of duration can be learned from external data. For example, from label durations or from a specific study on a duration of a specific sound event and/or scene.

Many types of model can be used as long as they are able to generate some sort of class-dependent duration or co-occurrence score/weight (e.g., graphs, decision trees etc.) which can, for example, be used to rescore a Viterbi path(s), or alternatively, be combined with the sound class scores by some method other than the Viterbi algorithm across the long term, for example across a sequence of score frames spanning 1.6 s.

Examples of the long-term acoustic analysis are given below, where the long-term acoustic analysis may thus apply a temporal structure constraint.

Score smoothing and thresholding

Viterbi optimal path search a recurrent DNN trained to integrate the frame decisions across a long-term window.

In more detail:

a) Score Smoothing and Thresholding Across Long Term Window

Median filtering or some other form of long-term low-pass filtering (for example a moving average filter) may be applied to the score values spanned by the long-term window. The smoothed scores may then be thresholded to turn the scores into class decisions, e.g., when a baby cry score is above the threshold then the decision for that frame is baby cry, otherwise the decision is world ("not a baby"). There is one threshold per class/per score.

b) Viterbi Optimal Path Search Across a Long Term Window

The Viterbi algorithm used to perform the long-term acoustic analysis comprises:

A state-space definition: there are S states where each state (s_i) is a sound class, for example: s_0=world; s_1=baby_cry; s_2=glass_break; etc. In one configuration there are 6 states however, in general there are as many states as there are classes to be recognised plus an extra state representing all other sounds (labelled as a 'world' class (i.e. a non-target sound class) in the above).

An array of initial probabilities: this is a S-sized array, where the i-th element is the probability that the decoded sequence starts with state i. In an example, these probabilities are all equal (for example, all equal to 1/S).

A transition matrix A: this is a S×S matrix where the element (i, j) is the probability of moving from state i to state j. In an example configuration, this matrix is used to block transitions between target classes, for example, the probabilities of the row 0 (world class) are all greater than zero, which means a state can move from world to all other target classes. But, in row 1 (baby cry) only columns 0 and 1 are non-zero, which means that from baby cry the state can either stay in the baby cry state or move to the world state. Corresponding rules apply for the other rows.

An emission matrix: this is a N×S matrix where the element (i, j) is the score (given by the acoustic model, after warping) of observing class j at the time frame i. In an example, N is equal to 100. In this example, the time window is 100 frames long (i.e. 1.6 seconds) and it moves with steps of 100 frames, so there is no overlap.

In other words, every time that the Viterbi algorithm is called, the Viterbi algorithm receives as an input, for example, 100 sound class scores and outputs 100 sound class decisions.

The settings are flexible, i.e., the number of frames could be set to a longer horizon and/or the frames could overlap.

Transition matrices can be used to forbid the transition between certain classes, for example, a dog bark decision can be forbidden to appear amongst a majority of baby cry decisions.

c) DNN Across a Long-Term Window

Examples of a DNN used to perform the long-term acoustic analysis performed are:

A long short-term memory recurrent neural network (LSTM-RNN) with 101 stacked frame score vectors (50 frames before and after a target frame), where score frame vectors contain 6 scores (one for each of 6 classes) as input. Thus, the input size is a 101 by 6 tensor. The rest of the DNN comprises 1 LSTM hidden layer with 50 units, hard sigmoid recurrent activation, and tanh activation. The output layer has 6 units for a 6-class system.

A gated recurrent units RNN (GRU-RNN): the input size is similarly a 101 by 6 tensor, after which there are 2 GRU hidden layers with 50 units each, and tanh activation. Before the output layer a temporal max pooling with a pool size of 2 if performed. The output layer has 6 units for a 6-class system.

Long-term information can be inflected by external duration or co-occurrence models, for example transition matrices in case c) of using a Viterbi optimal path search, or inflected by an external model made by learning the typical event and/or scene lengths, for example probabilities of event and/or scene duration captured by some machine learning method, typically DNNs.

The sound and/or scene recognition performed at sound recognition stage 414 further comprises processing the sound class decisions for a sequence of frames to recognise a non-verbal sound event and/or scene. In an example, the sound class decisions for multiple frames are input and an indication of one or more non-verbal sound events and/or scenes are output (see the non-verbal sound events and/or scenes identifiers 416a and a time identifier 416b associated with each sound/scene identifier 416a). Examples of how this may be performed are explained below, one or more of the below examples may be implemented:

a) the sound class decisions for each frame may be grouped into long-term event and/or scene symbols with a start time, an end time and a duration;

b) discarding a sequence of sound class decisions of the same class which are shorter than a sound event and/or scene duration threshold defined individually for each sound class. For example: a sequence of "baby cry" sound class decisions can be discarded if the sequence of "baby cry" sound class decisions are collectively shorter than 116 milliseconds (which is approximately equivalent to 10 frames); a sequence of "smoke alarm" sound class decisions can be discarded if the sequence of "smoke alarm" sound class decisions are collectively shorter than 0.4 seconds (which is approximately equivalent to 25 frames). The sound event and/or scene duration thresholds can be set manually for each class;

c) merging multiple non-verbal sound events and/or scenes of the same sound class that intersect a particular time window into one single non-verbal sound event and/or scene. For example, if two "baby cry" non-verbal sound events and/or scenes are determined to happen within a 4 seconds interval then they are merged into one a single "baby cry" non-verbal sound events and/or scenes, where the window duration (4 seconds in the above example) is a parameter which can be manually tuned. The window duration can be different for each sound class.

The sound recognition stage 414 outputs audio information 416 to the activity recognition stage 418 (on activity detection computing device 114). In the first embodiment, the audio information comprises the non-verbal sound events and/or scenes identifiers 416a and a time identifier 416b associated with each sound/scene identifier 416a.

Embodiment 1: Motion Recognition

Regarding the motion information, motion sensor data is acquired by a motion sensor 405, for example an accelerometer or a gyroscope, or a position sensor followed by a differentiation operation, for example a GPS sensor or a barometer, where motion information is derived from time series of position readings. The motion sensor data 420 is then sent to the motion information module 120 to perform a digital motion sensor signal acquisition stage 421 to output a sequence of motion sensor signal samples 440. In this example, the motion sensor data is grouped into a series of 6.4 s long frames with 3.2 long hop size, see the sequence of motion sensor signal samples 440. If the sampling frequency is 40 Hz, then this is equivalent to the digital motion sample being grouped into a series of frames that comprise 256 motion samples with a 128 audio samples-long hop size.

Once the digital motion sample has been acquired, feature extraction is performed on the frames of the digital motion samples 440 by kinetic feature extraction stage 424. The kinetic feature extraction stage 424 outputs a sequence of motion feature frames 446. The kinetic feature extraction stage 424 transforms the sequence of motion samples 440 into a series of multidimensional feature vectors 446 (i.e. frames), for example emitted every 16 ms. The feature extraction performed by the kinetic feature extraction stage 424 may be implemented in a variety of ways.

One implementation of the kinetic feature extraction stage 424 is to perform one or more signal processing algorithms on the sequence of motion sensor signal samples 440. An example of extracted features are applying a filtering algorithm (e.g. low-pass, Butterworth, Gaussian, Kalman and/or high-pass), then computing the zero-crossing rate, RMS energy, or computing a FFT and deriving the spectrum centroid, spectrum slope, entropy, or computing a wavelet transform or Matching Pursuit decomposition and deriving further features from the basis coefficients.

An additional or alternative implementation of the kinetic feature extraction stage 424 is to use a Deep Neural Network (DNN) to extract a number of motion features for a frame. A DNN can be configured to extract motion feature vectors of any dimension. A bottleneck DNN embedding or any other appropriate DNN embedding may be used to extract motion features. Here a neural network bottleneck may refer to a neural network which has a bottleneck layer between an input layer and an output layer of the neural network, where a number of units in a bottleneck layer is less than that of the input layer and less than that of the output layer, so that the bottleneck layer is forced to construct a generalised representation of the motion features input.

The motion feature frames 446 are then processed by a kinetic activity recognition stage 428 to recognise an activity, this processing can be performed in a number of ways, one method will be described below.

A first step of recognising an activity at the kinetic activity recognition stage 428 comprises a kinetic modelling step classifying the motion features to classify the frame by determining, for each of a set of activity classes, a score that the frame represents the activity class (an example of this can be seen in FIG. 5 being performed at kinetic activity scoring stage 528 which outputs kinetic activity class scores 530). In an embodiment, the kinetic modelling step comprises using a deep neural network (DNN) trained to classify each incoming motion feature vector into a activity class (e.g. daily activities such as eating, walking, climbing stairs, or sports activities such as jogging, cycling, tennis, or professional activities such as lifting boxes, operating a machine, computer typing, or any other human activity involving motion of the body). It should be noted that motion of the body can be induced by a vehicle or another object. Therefore, the input of the DNN is a motion feature vector and the output is a score for each activity class. The scores for each activity class for a frame may collectively be referred to as a frame score vector. For example, the DNN used in the kinetic activity recognition stage 428 (and the kinetic activity scoring stage 528) is configured to output a score for each activity class modelled by the system every 16 ms.

An example DNN used by the kinetic activity recognition stage 428 (and kinetic activity scoring stage 528) is a feed-forward fully connected DNN having 992 inputs (a concatenated feature vector comprising 15 motion feature vectors before and 15 motion feature vectors after a central motion feature vector=31 frames×32 dimensions in total). The example DNN has 3 hidden layers with 128 units per layer and RELU activations.

Alternatively, a convolutional neural network (CNN), a recurrent neural network (RNN) and/or some other form of deep neural network architecture or combination thereof could be used.

With a brief reference to FIG. 5, a schematic example of an output of the DNN is shown in the form of kinetic activity class scores 530. In this example, there are three different sound classes represented by three colours: grey (530*c*), red (530*b*) and blue (530*a*). The horizontal axis represents time and the vertical axis represents a value of a score (where a downward vertical direction represents a high score). Each dot is a score value corresponding to a frame of motion data.

Returning to FIG. 4 and the example embodiment of the processing performed by the kinetic activity recognition stage 428, following the described kinetic modelling step classifying the motion features, long-term activity analysis is performed. The long-term activity analysis comprises processing the kinetic activity class scores for multiple frames of the sequence of frames to generate, for each frame, an activity class decision for each frame. The long-term activity analysis outputs frame-level classification decisions after integrating longer term temporal information, typically spanning one or several seconds, into the frame-level scoring.

As an example, if there are four activity classes: A, B, C and D, the long-term activity analysis performed will comprise receiving a sequence of vectors. Each vector would have four dimensions, where each dimension represents a (optionally reweighted) score for an activity class. The long-term activity analysis performed at kinetic activity recognition stage 428 comprises processing the multiple vectors that represent a long-term window, typically 1.6 second/100 score values long context window. The long-term activity analysis will then comprise outputting a series of classification decisions for each frame (i.e. the output will be A, B, C or D for each frame, rather than 4 scores for each frame). The long-term activity analysis therefore uses information derived from frames across a long-term window.

The long-term acoustic analysis can be used in conjunction with external duration or co-occurrence models. For example:

Transition matrices can be used to impart long-term information and can be trained independently of Viterbi. Transition matrices are an example of a co-occurrence model and also implicitly a duration model. Co-occurrence models comprise information representing a relation or an order of events and/or scenes.

An explicit model of duration probabilities can be trained from ground truth labels (i.e. known data). Generally, the statistics of duration can be learned from external data. For example, from label durations or from a specific study on a duration of a specific sound event and/or scene.

Many types of model can be used as long as they are able to generate some sort of class-dependent duration or co-occurrence score/weight (e.g., graphs, decision trees etc.) which can, for example, be used to rescore a Viterbi path(s), or alternatively, be combined with the activity class scores by some method other than the Viterbi algorithm across the long term, for example across a sequence of score frames spanning 1.6 s.

Examples of the long-term acoustic analysis have been described above in relation to sound recognition stage 414, where the long-term acoustic analysis may thus apply a temporal structure constraint.

Score smoothing and thresholding

Viterbi optimal path search a recurrent DNN trained to integrate the frame decisions across a long-term window.

The kinetic activity recognition stage 428 outputs motion information 430 to the activity recognition stage 418 (on activity detection computing device 114). In the first embodiment, the motion information 430 comprises a sequence of activity identifiers 430*a* and an associated time identifier 430*b*.

Embodiment 1: Activity Recognition Notification

As discussed above, in the embodiment illustrated in FIG. 4 the activity detection computing device 114 receives motion information in the form of a sequence of activity identifiers 430*a* and associated time identifiers 430*b* and further receives audio information in the form of the non-verbal sound event and/or scene identifiers 416 and associated time identifier 416*b*. The activity recognition stage 418 processes these inputs to generate an activity recognition notification indicating the activity of the user 103. As an example, the computing device may process these inputs by processing the non-verbal sound event and/or scene identifiers 416 and associated time identifier 416*b* to:

confirm the sequence of activity identifiers 430*a* and associated time identifiers 430*b*;

delete the sequence of activity identifiers 430*a* and associated time identifiers 430*b*; or modify the sequence of activity identifiers 430*a* and associated time identifiers 430*b*.

The activity recognition stage 418 may operate in numerous ways. In one example the activity recognition stage 418 is configured to operate in accordance with a set of a predefined rules expressed programmatically (e.g., if x happens 10 seconds after y then delete). In another example the activity recognition stage 418 is configured to operate using a machine-learned decision system, e.g. a decision tree or a deep neural network. In another example the activity recognition stage 418 is configured to operate using a machine-learned natural language processing system, e.g. based on long short-term memory (LSTM) neural networks.

The activity recognition stage 418 generates and outputs an activity recognition notification 432. The activity recognition notification 432 may comprise one or more activity recognition identifier 432*a* whereby each activity recognition identifier 432*a* is associated with a time identifier 432*b*.

The activity recognition notification is sent to, for example, an API or activity processing module on a notification device configured to utilise the received activity recognition notification. This is described in more detail below.

Embodiment 2: Sound Recognition

FIG. 5 shows a schematic diagram illustrating an implementation of a second embodiment.

One or more non-verbal sounds are acquired by a microphone 503, for example microphone 113 of FIG. 1. The audio samples 504 are supplied to an analogue to digital converter 506 (e.g. the analogue to digital converter (ADC) 216 in FIG. 2) and converted from analogue samples to digital samples. The microphone 503 may correspond to the microphone 113 shown in FIG. 2. The analogue to digital converter 506 may correspond to the ADC 216 shown in FIG. 2. With reference to FIG. 2, the processor 220 is configured to receive the digital samples from the ADC 216 via the interface 218, for example a serial interface such as 120. The sampling frequency may be 16 kHz, this means that 16,000 audio samples are taken per second.

The analogue to digital converter 506 outputs a sequence of digital audio samples 538. The digital audio samples may be grouped into a series of 32 ms long frames with 16 ms long hop size. If the sampling frequency is 16 Khz, then this is equivalent to the digital audio sample being grouped into a series of frames that comprise 512 audio samples with a 256 audio samples-long hop size.

Once the digital audio samples have been acquired, feature extraction is performed on frames of the digital audio samples 538, by acoustic feature extraction stage 510. The acoustic feature extraction stage 510 outputs a sequence of acoustic feature frames 544. The acoustic feature extraction stage 510 transforms the sequence of digital waveform samples 538 into a series of multidimensional feature vectors 544 (i.e. frames), for example emitted every 16 ms. The acoustic feature extraction of stage 510 may be implemented in a variety of ways.

One implementation of acoustic feature extraction stage 510 is to perform one or more signal processing algorithms on the sequence of digital waveform samples 538. An example of a signal processing algorithm is an algorithm that processes a power spectrum of the frame to extract a spectral flatness value for the frame. A further example is a signal processing algorithm that extracts harmonics and their relative amplitudes from the frame.

An additional or alternative implementation of the acoustic feature extraction stage 510 is to use a Deep Neural Network (DNN) to extract a number of acoustic features for a frame. A DNN can be configured to extract audio feature vectors of any dimension. A bottleneck DNN embedding or any other appropriate DNN embedding may be used to extract acoustic features. Here a neural network bottleneck may refer to a neural network which has a bottleneck layer between an input layer and an output layer of the neural network, where a number of units in a bottleneck layer is less than that of the input layer and less than that of the output layer, so that the bottleneck layer is forced to construct a generalised representation of the acoustic input.

The acoustic feature frames 544 are then processed to recognise a sound and/or scene at sound scoring stage 514, this processing can be performed in a number of ways, an example method is described below.

A first step of recognising a sound and/or scene performed at sound scoring stage 514 comprises an acoustic modelling step classifying the acoustic features to classify the frame by determining, for each of a set of sound classes, a score 516 that the frame represents the sound class. In an embodiment, the acoustic modelling step comprises using a deep neural network (DNN) trained to classify each incoming acoustic feature vector into a sound class (e.g. glass break, dog bark, baby cry etc.). Therefore, the input of the DNN is an acoustic feature vector and the output is a score for each sound class. The scores for each sound class for a frame may collectively be referred to as a frame score vector. For example, the DNN used in the sound scoring stage 514 is configured to output a score for each sound class modelled by the system every 16 ms.

An example DNN used in sound scoring stage 514 is a feed-forward fully connected DNN having 992 inputs (a concatenated feature vector comprising 15 acoustic vectors before and 15 acoustic vectors after a central acoustic vector=31 frames×32 dimensions in total). The example DNN has 3 hidden layers with 128 units per layer and RELU activations.

Alternatively, a convolutional neural network (CNN), a recurrent neural network (RNN) and/or some other form of deep neural network architecture or combination thereof could be used.

A schematic example of sound class scores 516 that are output by the DNN is shown in FIG. 5. In this example, there are three different sound classes represented by three colours: grey (516*c*), red (516*b*) and blue (516*a*). The horizontal axis represents time and the vertical axis represents a value of a score (where a downward vertical direction represents a high score). Each dot is a score value corresponding to a frame of audio data.

The output of the sound scoring stage 514 is sound class scores 516 to activity recognition stage 518 (on the activity detection computing device 114).

Thus, in the second embodiment, the audio information provided to the activity recognition stage 518 comprises sound class scores 516.

Embodiment 2: Motion Recognition

Regarding the motion information, motion sensor data is acquired by a motion sensor 505, for example an accelerometer or GPS sensor. The motion sensor data 520 is supplied to the motion information module 120 to perform a digital motion sensor signal acquisition stage 521 to output a sequence of motion sensor signal samples 540. In this example, the motion sensor data is grouped into a series of 6.4 s long frames with 3.2 s long hop size, see the sequence of motion sensor signal samples 540 provided as an output of the digital motion sensor signal acquisition stage 521. If the sampling frequency is 40 Hz, then this is equivalent to the digital motion sample being grouped into a series of frames that comprise 256 motion samples with a 128 audio samples-long hop size.

Once the digital motion sample has been acquired, feature extraction is performed on frames of the digital motion samples 540, by kinetic feature extraction stage 524. The kinetic feature extraction stage 524 outputs a sequence of motion feature frames 546. The kinetic feature extraction stage 524 transforms the sequence of motion samples 540 into a series of multidimensional feature vectors 546 (i.e. frames), for example emitted every 16 ms. The feature extraction performed by the kinetic feature extraction stage 524 may be implemented in a variety of ways.

One implementation of kinetic feature extraction stage 524 is to perform one or more signal processing algorithms on the sequence of motion sensor signal samples 540. An example of a signal processing algorithm is an algorithm that processes a power spectrum of the frame, for example obtained using the fast Fourier transform (FFT), to extract a spectral flatness value for the frame. A further example is a signal processing algorithm that extracts harmonics and their relative amplitudes from the frame.

An additional or alternative implementation of the kinetic feature extraction stage 524 is to use a Deep Neural Network (DNN) to extract a number of motion features for a frame. A DNN can be configured to extract motion feature vectors of any dimension. A bottleneck DNN embedding or any other appropriate DNN embedding may be used to extract motion features. Here a neural network bottleneck may refer to a neural network which has a bottleneck layer between an input layer and an output layer of the neural network, where a number of units in a bottleneck layer is less than that of the input layer and less than that of the output layer, so that the bottleneck layer is forced to construct a generalised representation of the motion features input.

The motion feature frames 546 are then processed to recognise an activity at kinetic activity scoring stage 528, this processing can be performed in a number of ways, an example method will be described below.

A first step of recognising an activity at kinetic activity scoring stage 528 comprises a kinetic modelling step classifying the motion features to classify the frame by determining, for each of a set of activity classes, a score 530 that the frame represents the activity class. In an embodiment, the kinetic activity modelling step comprises using a deep neural network (DNN) trained to classify each incoming motion feature vector into an activity class (e.g. daily activities such as eating, walking, climbing stairs, or sports activities such as jogging, cycling, tennis, or professional activities such as lifting boxes, operating a machine, computer typing, or any other human activity involving motion of the body). It should be noted that motion of the body can be induced by a vehicle or another object. Therefore, the input of the DNN is a motion feature vector and the output is a score for each activity class. The scores for each activity class for a frame may collectively be referred to as a frame score vector. For example, the DNN used in the kinetic activity scoring stage 528 is configured to output a score for each activity class modelled by the system every 16 ms.

An example DNN used in the kinetic activity scoring stage 528 is a feed-forward fully connected DNN having 992 inputs (a concatenated feature vector comprising 15 motion features vectors before and 15 motion features vectors after a central motion features vector=31 frames×32 dimensions in total). The example DNN has 3 hidden layers with 128 units per layer and RELU activations.

Alternatively, a convolutional neural network (CNN), a recurrent neural network (RNN) and/or some other form of deep neural network architecture or combination thereof could be used.

A schematic example of kinetic activity class scores 530 that are provided as an output of the DNN is shown in FIG. 5. In this example, there are three different sound classes represented by three colours: grey (530*c*), red (530*b*) and blue (530*a*). The horizontal axis represents time and the vertical axis represents a value of a score (where a downward vertical direction represents a high score). Each dot is a score value corresponding to a frame of motion data.

Thus, in the second embodiment, the motion information provided to the activity recognition stage 518 comprises kinetic activity class scores 530.

Embodiment 2: Activity Recognition Notification

As discussed above, in the second embodiment illustrated in FIG. 5 the activity detection computing device 114 receives audio information in the form of sound class scores 516 and motion information in the form of activity class scores 530. The activity recognition stage 518 processes these inputs to generate an activity recognition notification indicating the activity of the user 103. As an example, the activity recognition stage 518 may process these inputs to generate a sequence 533 of activity identifiers and associated time identifiers. In FIG. 5 an example of an activity identifier is the activity identifier 533*a* 'running start' and the associated time identifier 533*b* is 't=0.104 s'.

One example embodiment of how to generate the sequence 533 of activity identifiers and associated time identifiers is by treating the scores (i.e. the sound class scores 516 and motion activity class scores 530) are considered as a feature space and a machine learning model is trained on scores in that feature space.

In an example embodiment, vectors of scores values (one value per class) are emitted every 16 ms for the sound class scores 516, and every 3.2 s for the motion activity class scores 530. The sound class scores 516 and the motion activity class scores 530 are concatenated synchronously into stacked score vectors. In this example, because the motion activity class scores 530 are emitted less frequently than the sound class scores 516 then 200 concatenated score vectors will have the same motion activity class scores with varying sound class scores (i.e. 3.2*s* motion activity class score rate/16 ms sound class score rate=200 acoustic scores for 1 kinetic score).

The concatenated scores become the feature space where a model is machine learned. The machine learned model used in the activity recognition stage 518 is trained to receive concatenated scores and output a sequence 533 of activity identifiers and associated time identifiers.

There does not need to be initial correspondence between classes of the sound class scores 516 and the motion activity class scores 530. For example, if the motion activity class scores comprise a class "cycling", and the sound class scores 516 comprises a class "bicycle ride", then the original classes (i.e. cycling and bicycle ride) can be ignored. Rather, the sequence 533 of activity identifiers will belong to a class that the learned model used in the activity recognition stage is trained to output.

In other words, the result of the processing performed by the activity recognition stage 518 is to generate and output an activity recognition notification 532. The activity recognition notification may comprise one or more activity recognition identifier 533a, each activity recognition identifier 533a associated with a time identifier 533b.

The activity recognition notification is sent to, for example, an API or activity processing module on a notification device configured to utilise the received activity recognition notification. This is described in more detail below.

Embodiment 3: Sound Recognition

Figure 6:
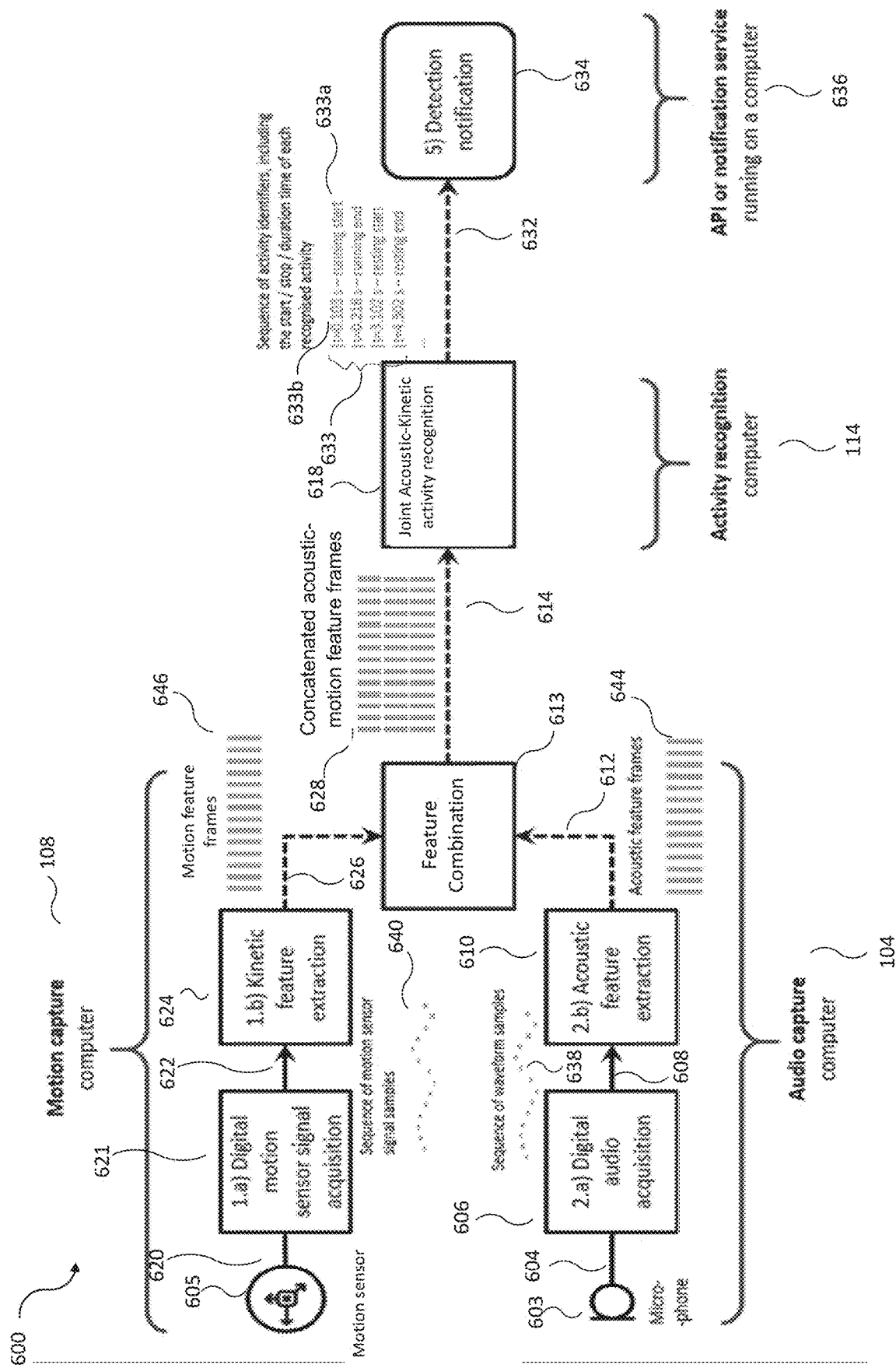
FIG. 6 is a schematic diagram illustrating an implementation of a third embodiment of the present disclosure.

FIG. 6 shows a schematic diagram illustrating an implementation of a third embodiment.

One or more non-verbal sounds are acquired by a microphone 603, for example microphone 113 of FIG. 1. The audio samples 604 are then supplied to an analogue to digital converter 606 and converted from analogue samples to digital samples. The microphone 603 may correspond to the microphone 113 shown in FIG. 2. The analogue to digital converter 606 may correspond to the ADC 216 shown in FIG. 2. With reference to FIG. 2, the processor 220 is configured to receive the digital sample from the ADC 216 via the interface 218, for example a serial interface such as I2C. The sampling frequency may be 16 kHz, this means that 16,000 audio samples are taken per second.

The analogue to digital converter 606 outputs a sequence of digital audio samples 638. The digital audio samples may be grouped into a series of 32 ms long frames with 16 ms long hop size. If the sampling frequency is 16 Khz, then this is equivalent to the digital audio sample being grouped into a series of frames that comprise 512 audio samples with a 256 audio samples-long hop size.

Once the digital audio samples have been acquired, feature extraction is performed on frames of the digital audio samples 638, by the acoustic feature extraction stage 610. The acoustic feature extraction stage 610 outputs a sequence of acoustic feature frames 644. The acoustic feature extraction step 610 transforms the sequence of waveform samples 638 into a series of multidimensional feature vectors 644 (i.e. frames), for example emitted every 16 ms. The feature extraction performed by the acoustic feature extraction stage 610 may be implemented in a variety of ways.

One implementation of acoustic feature extraction stage 610 is to perform one or more signal processing algorithms on the sequence of digital waveform samples 638. An example of a signal processing algorithm is an algorithm that processes a power spectrum of the frame to extract a spectral flatness value for the frame. A further example is a signal processing algorithm that extracts harmonics and their relative amplitudes from the frame.

An additional or alternative implementation of the acoustic feature extraction stage 610 is to use a Deep Neural Network (DNN) to extract a number of acoustic features for a frame. A DNN can be configured to extract audio feature vectors of any dimension. A bottleneck DNN embedding or any other appropriate DNN embedding may be used to extract acoustic features. Here a neural network bottleneck may refer to a neural network which has a bottleneck layer between an input layer and an output layer of the neural network, where a number of units in a bottleneck layer is less than that of the input layer and less than that of the output layer, so that the bottleneck layer is forced to construct a generalised representation of the acoustic input.

Embodiment 3: Motion Recognition

Regarding the motion information, motion sensor data is acquired by a motion sensor 605, for example an accelerometer or GPS sensor. The motion sensor data 620 is then supplied to the motion information module 120 to perform a digital motion sensor signal acquisition stage 621 that is configured to output a sequence of motion sensor signal samples 640. In this example, the motion sensor data is grouped into a series of 6.4 s long frames with 3.2 s long hop size, see the sequence of motion sensor signal samples 640. If the sampling frequency is 40 Hz, then this is equivalent to the digital motion sample being grouped into a series of frames that comprise 256 motion samples with a 128 audio samples-long hop size.

Once the digital motion samples have been acquired, feature extraction is performed on the frames of the digital motion sample 640, by kinetic feature extraction stage 624. The kinetic feature extraction stage 624 outputs a sequence of motion feature frames 646. The kinetic feature extraction stage 624 transforms the sequence of motion samples 640 into a series of multidimensional feature vectors 646 (i.e. frames), for example emitted every 16 ms. The feature extraction performed by the kinetic feature extraction stage 624 may be implemented in a variety of ways.

One implementation of the kinetic feature extraction stage 624 is to perform one or more signal processing algorithms on the sequence of motion sensor signal samples 640. An example of a signal processing algorithm is an algorithm that processes a power spectrum of the frame, for example obtained using the fast Fourier transform (FFT), to extract a spectral flatness value for the frame. A further example is a signal processing algorithm that extracts harmonics and their relative amplitudes from the frame.

An additional or alternative implementation of the kinetic feature extraction stage 624 is to use a Deep Neural Network (DNN) to extract a number of motion features for a frame. A DNN can be configured to extract motion feature vectors of any dimension. A bottleneck DNN embedding or any other appropriate DNN embedding may be used to extract motion features. Here a neural network bottleneck may refer to a neural network which has a bottleneck layer between an input layer and an output layer of the neural network, where a number of units in a bottleneck layer is less than that of the input layer and less than that of the output layer, so that the bottleneck layer is forced to construct a generalised representation of the motion features input.

Embodiment 3: Activity Recognition Notification

At the feature combination stage 613 the acoustic feature frames 644 and the motion feature frames 646 are combined. The acoustic feature frames 644 and the motion feature frames 646 may be combined in a number of different ways. For example, the acoustic feature frames 644 and the motion feature frames 646 can be combined by concatenation, linear combination or non-linear combination. As an example, non-linear combination may comprise oversampling, sub-sampling or logistic regression. FIG. 6 illustrates the feature combination stage 613 providing an output of a sequence of concatenated acoustic and motion feature frames 628.

The feature combination stage 613 may be performed by the activity detection computing device 114. In an embodiment a device comprises the microphone 603 and the motion sensor 605, if this is the case then the feature combination stage 613 may be performed by the device comprising the microphone 603 and the motion sensor 605.

In an example embodiment, an acoustic feature frame (of the acoustic feature frames 644) is emitted every 16 ms, and a motion feature frame (of the motion feature frames 646) is emitted every 3.2 s. The acoustic feature frames 644 and the motion feature frames 646 are concatenated synchronously into concatenated acoustic-motion feature frames 628. In this example, because the motion feature frames 646 are emitted less frequently than the acoustic feature frames 644, then 200 concatenated acoustic-motion feature frames will have the same motion feature frame with varying acoustic feature frames (i.e. 3.2 s motion feature frame rate/16 ms acoustic feature frame rate=200 acoustic feature frames for 1 motion feature frame).

In other words, the concatenation may only be time-synchronous, i.e. 1 motion feature frame repeated 200 times concatenated with the 200 corresponding acoustic feature frames. There may be no concatenation of frames before/after time horizon (where the time horizon may be the time of a motion feature frame), only concatenation of feature frames (motion and acoustic) that are aligned in time. That said, the outputted concatenated acoustic-kinetic feature frames 628 may be stacked with a time horizon at the stage 618.

At the joint acoustic-kinetic activity recognition stage 618 the combined acoustic and motion feature frames 628 are processed to generate an activity recognition notification.

The concatenated acoustic-kinetic feature frames 628 become the feature space where a machine learning model is trained. The machine learning model used in the activity recognition stage 518 is trained to receive concatenated acoustic-kinetic feature frames 628 and output a sequence 633 of activity identifiers and associated time identifiers.

As an example, the computing device may process these inputs to generate an activity recognition notification comprising a sequence 633 of one or more activity identifiers 633a, each of the one or more activity identifiers 633a associated with a time identifier 633b. In FIG. 6 an example of an activity identifier is the activity identifier 633a 'running start' and the associated time identifier 633b is 't=0.1035'.

In other words, the result of the processing performed by the joint acoustic-kinetic activity recognition stage 618 is to generate and output an activity recognition notification 632. The activity recognition notification may comprise an activity recognition identifier 633a and an associated time identifier 633b associated with the activity recognition identifier.

The activity recognition notification is sent to, for example, an API or activity processing module on a notification device configured to utilise the received activity recognition notification.

In the above described embodiments, the notification device may correspond to the activity detection computing device 104 or a remote device (not shown in the Figures). The notification device may output a detection notification 434,534,634 based on the activity recognition notification 432,532 632 that it receives. The detection notification may prompt a user to perform an action.

For example in embodiments where the notification device is a wearable device such as a fitness tracker or smart watch, the notification device may output a detection notification in the form of an audible or visual message e.g. "you are playing tennis, would you like me to log that into your fitness log?". In embodiments where the notification device is a smartphone, the notification device may output a detection notification in the form of an audible or visual message e.g. "you moved a lot during your sleep last night, would you like me to change your wake-up time?". In embodiments where the notification device is a smart speaker the notification device may output a detection notification in the form of an audible or visual message e.g. "you are cooking an egg, would you like me to pre-heat the toaster?" or "you are in your car, shall I start the heating at home?". In embodiments where the notification device is a smart camera the notification device may output a detection notification in the form of an audible or visual message e.g. "a fall was detected, I am going to start recording and call an emergency service". In embodiments where the notification device is in a vehicle, the notification device may output a detection notification in the form of an audible or visual message e.g. "your hands are trembling on the wheel, would you like me to slow down the car?", "the car is moving in a parking lot (I can hear reverb), should I switch on parking assistance?". In embodiments where the notification device is an industrial monitoring device, the notification device may output a detection notification in the form of an audible or visual message e.g. "anomaly has been detected from motion and sound on this machine, alert or switch it off". It will be appreciated that these are merely examples and embodiments are not limited to these examples.

Generally, any of the functions described herein can be implemented using software, firmware, hardware (e.g., fixed logic circuitry), or a combination of these implementations. The terms "module," "functionality", and "stage" as used herein generally represent software, firmware, hardware, or a combination thereof. In the case of a software implementation, the module, functionality, or stage represents program code that performs specified tasks when executed on a processor (e.g. CPU, CPUs or GPUs). The program code can be stored in one or more computer readable memory devices. The features of the techniques described below are platform-independent, meaning that the techniques may be implemented on a variety of commercial computing platforms having a variety of processors.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The invention claimed is:

1. A computing device, the computing device comprising a processor configured to:
  receive audio information relating to one or more non-verbal sounds captured by a microphone in an environment of a user, wherein the audio information comprises, for each frame of a sequence of frames of audio data captured by the microphone, a score for each of a set of sound classes that the frame represents the sound class;
  receive motion information that is based on motion sensor data captured by a motion sensor, said motion information relating to motion of said user in the environment, wherein the motion information comprises, for each frame of a sequence of frames of motion data captured by the motion sensor, a score for each of a set of activity classes that the frame represents the activity class;

process the audio information and the motion information to recognise an activity of said user by:
inputting the audio information and the motion information into a model configured to receive the scores for the set of sound classes and the scores for the set of activity classes and return an activity recognition notification indicating said activity; and
receiving, from the model, the activity recognition notification indicating said activity;
output the activity recognition notification indicating said activity.

2. The computing device of claim 1, wherein the processor is configured to process the audio information and the motion information to recognise an activity of said user by:
inputting each frame of:
said scores for each of a set of sound classes that the frame represents the sound class; and
said scores for each of a set of activity classes that the frame represents the activity class;
into into the model, wherein the model comprises a machine learning model trained to recognise an activity.

3. The computing device of claim 1, wherein the activity recognition notification comprises an indication of a time associated with the recognised activity.

4. The computing device of claim 1, wherein the processor is configured to receive one or more of the audio information and the motion information from at least one remote computing device.

5. The computing device of claim 1, wherein the computing device comprises one or more of: the microphone; and the motion sensor.

6. The computing device of claim 1, wherein the processor is configured to output the activity recognition notification to an output device on said computing device.

7. The computing device of claim 1, wherein the processor is configured to output the activity recognition notification to an activity processing module on said computing device.

8. The computing device of claim 1, wherein the processor is configured to output the activity recognition notification, via a network interface on said computing device, to a remote notification device.

9. The computing device of claim 1, wherein said motion information is based on information captured by one or more of: an accelerometer; a gyroscope; a magnetometer; a location sensor; a barometer; a pressure sensor; and a radio wave sensor.

10. The computing device of claim 1, wherein the computing device is one of: a smart phone; a smart speaker; an in-vehicle device; a wearable device; a hearable device; and an industrial monitoring device; a virtual reality headset; an augmented reality headset; a game controller.

11. A computer implemented method of recognising an activity of a user, the method comprising:
receiving audio information relating to one or more non-verbal sounds captured by a microphone in an environment of the user, wherein the audio information comprises, for each frame of a sequence of frames of audio data captured by the microphone, a score for each of a set of sound classes that the frame represents the sound class;
receiving motion information that is based on motion sensor data captured by a motion sensor, said motion information relating to motion of said user in the environment, wherein the motion information comprises, for each frame of a sequence of frames of motion data captured by the motion sensor, a score for each of a set of activity classes that the frame represents the activity class;
processing the audio information and the motion information to recognise an activity of said user by:
inputting the audio information and the motion information into a model configured to receive the scores for the set of sound classes and the scores for the set of activity classes, and return an activity recognition notification indicating said activity; and
receiving, from the model, an activity recognition notification indicating said activity; and
outputting the activity recognition notification indicating said activity.

12. A non-transitory data carrier carrying processor control code which when running on a processor of a device causes the device to perform the method of claim 11.

13. A computing device, the computing device comprising a processor configured to:
receive audio information relating to one or more non-verbal sounds captured by a microphone in an environment of a user, wherein the audio information comprises multiple acoustic features for each frame of a sequence of frames of audio data captured by the microphone; and
receive motion information that is based on motion sensor data captured by a motion sensor, said motion information relating to motion of said user in the environment, wherein the motion information comprises multiple motion features for each frame of a sequence of frames of motion data captured by the motion sensor;
process the audio information and the motion information to recognise an activity of said user by:
inputting the audio information and the motion information into a model configured to: receive the audio features and the motion features and return an activity recognition notification indicating said activity; and
receiving, from the model, the activity recognition notification indicating said activity;
output the activity recognition notification indicating said activity.

14. The computing device of claim 13, wherein the processor is configured to process the audio information and the motion information to recognise an activity of said user by:
for each frame, concatenating the multiple acoustic features and the multiple motion features to generate a frame of concatenated acoustic-motion features; and
inputting each frame of concatenated acoustic-motion features into the model, wherein the model comprises a machine learning model trained to recognise an activity.

15. The computing device of claim 13, wherein the activity recognition notification comprises an indication of a time associated with the recognised activity.

16. The computing device of claim 13, wherein the processor is configured to receive one or more of the audio information and the motion information from at least one remote computing device.

17. The computing device of claim 13, wherein the processor is configured to output the activity recognition notification to any one of an output device on said computing device; an activity processing module on said computing device; and a remote notification device, via a network interface, on said computing device.

18. The computing device of claim 13, wherein:
said motion information is based on information captured by one or more of: an accelerometer; a gyroscope; a magnetometer; a location sensor; a barometer; a pressure sensor; and a radio wave sensor; and
the computing device is one of a smart phone; a smart speaker; an in-vehicle device; a wearable device; a hearable device; and an industrial monitoring device; a virtual reality headset; an augmented reality headset; a game controller.

19. A computer implemented method of recognising an activity of a user, the method comprising:
receiving audio information relating to one or more non-verbal sounds captured by a microphone in an environment of a user, wherein the audio information comprises multiple acoustic features for each frame of a sequence of frames of audio data captured by the microphone;
receiving motion information that is based on motion sensor data captured by a motion sensor, said motion information relating to motion of said user in the environment, wherein the motion information comprises multiple motion features for each frame of a sequence of frames of motion data captured by the motion sensor;
processing the audio information and the motion information to recognise an activity of said user by:
inputting the audio information and the motion information into a model configured to: receive the audio features and the motion features and return an activity recognition notification indicating said activity; and
receiving, from the model, the activity recognition notification indicating said activity; and
outputting the activity recognition notification indicating said activity.

20. A non-transitory data carrier carrying processor control code which when running on a processor of a device causes the device to perform the method of claim 19.

* * * * *